July 2, 1968

D. L. KIRSCH ET AL 3,390,738

ADJUSTABLE MUFFLER WITH DEFORMABLE END
PLATES AND ROLLED PIPE JOINTS
Filed April 5, 1966

INVENTORS
DONALD L. KIRSCH
PETER C. WRIGHT by *Leon Arthurs*

Agent.

United States Patent Office 3,390,738
Patented July 2, 1968

3,390,738
ADJUSTABLE MUFFLER WITH DEFORMABLE
END PLATES AND ROLLED PIPE JOINTS
Donald L. Kirsch, 315 Vesta Drive, Toronto, Ontario,
and Peter C. Wright, Etobicoke, Ontario, Canada; said
Wright assignor to said Kirsch
Filed Apr. 5, 1966, Ser. No. 540,401
9 Claims. (Cl. 181—61)

ABSTRACT OF THE DISCLOSURE

A replacement automobile muffler having inlet and outlet exhaust pipes each mounted in a deformable end plate of the muffler to accommodate ready deflection of the pipes to suit the requirements of differing automobiles, each pipe being mounted in its associated end plate by means of a rolled convoluted joint.

---

The present invention relates to mufflers or silencers for motor vehicles and a broad object is to provide improvements in muffler construction enabling the provision of a universal replacement muffler for a plurality of different makes and models of vehicles.

As is well known a replacement muffler for a motor vehicle is conventionally installed between the existing tail pipe and manifold exhaust of the vehicle which not only determines the required length of the replacement muffler but also the placement and orientation of its outlet and inlet exhaust pipes which are required to align with and be coupled to the said tail pipe and manifold exhaust.

It is equally well known that owing to variations in vehicular construction, it was by no means unusual that a replacement muffler designed to fit one vehicle was heretofore resultantly incompatible with the requirements of another, whereby vehicle repair depots were required to store numerous varieties of mufflers in order to meet the replacement requirements of the different makes and models of vehicles in general current use.

Apart from its capacity to accommodate and transmit the exhaust gases of a vehicle, the efficiency of a muffler may be rated according to its ability not only to subdue but also to modify exhaust noises. From this viewpoint there is very little functional difference between mufflers generally and it is accordingly obvious that a universal muffler to serve as a replacement on a large number of different vehicles is distinctly feasible and possible subject, of course, to dimensional considerations and the placement and orientation of its inlet and outlet exhaust pipes, as well as to its gas capacity.

It is therefore a more particular object of the invention to provide an improved automotive muffler wherein the orientation of the inlet and outlet exhaust pipes can be readily adjusted to meet the requirements of a plurality of different makes and/or models of vehicle without appreciably impairing the efficiency or durability of the muffler.

It is a further object of the invention to provide a muffler as aforesaid wherein the exhaust pipes themselves need not be deformed to effect such adjustment, since in many instances exhaust pipes need not be offset or reshaped in any way but may remain rectilinear, saving time in the fitting of the muffler as well as in its installation and further facilitating passage of gases therethrough.

It is a further object of the invention to provide in a muffler as aforesaid a strong, gas-tight connection between said exhaust pipes and respective end plates of the muffler, said connection being capable of withstanding radial stresses applied to the exhaust pipes and inhibiting relative rotation between said pipes and plates. It is noteworthy, moreover, that the invention particularly seeks to avoid welded connections joining the exhaust pipes and end plates in view of the brittleness of such connections which could be an obstacle to adjusting the pipes as contemplated by the invention.

It is a further object of the invention to provide a muffler as aforesaid wherein engagement of each exhaust pipe with its corresponding end plate is effected over a relatively broad area extending radially from said pipe whereby radial stress applied to the pipe is transmitted to the end plate over said area.

It is a further object of the invention to provide a muffler as aforesaid wherein the re-orientation of the exhaust pipes may be and is in fact achieved by warping the respective end closure plates of the muffler.

In addition the invention has also the broad object of providing a muffler construction of efficiency which is, at least, adequate to the requirements of a wide variety of vehicles, rendering it particularly appropriate to the universal objectives of the invention.

For example, a relatively short muffler casing may house an internal mechanism giving it the efficiency of a much longer standard muffler, the short muffler of the invention being then equipped with relatively long, deflectable inlet and outlet exhaust pipes—which may be trimmed down if necessary—to adapt it as an acceptable replacement for the longer standard muffler.

It is a further object of the invention to provide an improved automotive muffler wherein the internal mechanism readily permits deflection of the inlet and outlet exhaust pipes when it is necessary to re-orient the latter preparatory to installing the muffler on a vehicle.

Further objects of the invention include the provision of a method of securing an exhaust pipe to an end closure plate of a muffler and of a method of making a replacement muffler as aforesaid.

The foregoing and other objects of the invention are achieved by an automotive muffler comprising a tubular outer casing initially open at both ends. Closure plates are secured to and close the respective ends of said casing; said closure plates having exhaust openings formed therein for respectively admitting and discharging gases travelling through said casing. The casing contains structure for treating the gases travelling therethrough to modify the sounds entrained in such gases. For a purpose that will appear the edges of each exhaust opening are turned inwardly towards the interior of the casing, forming an integral inturned collar surrounding the opening. Inlet and outlet exhaust pipes are provided each having an open end telescopically installed in one of said collars with the collar and pipe edges substantially conterminous. To form a frictional gas-tight connection between said pipe and closure plate the collar and pipe edges are rolled in symmetrical mating convolutions which constitute a continuous interlock surrounding the exhaust opening. The exhaust opening extends over only a relatively minor fraction of the total area of the closure plate, which plate is warpable under radial stress applied to the exhaust pipe to deflect said pipe into a predetermined desired direction.

In a preferred embodiment the interior structure of the muffler includes a plurality of plate-like baffles disposed in the line of travel of gas through the muffler. To permit passage of gas therethrough each baffle has a plurality of pairs of vents formed therein, the vents of each pair being oriented so that streams of gas passing therethrough are deflected towards and impinge upon each other.

Further objects, features and advantages of the invention will become apparent from the ensuing description of an exemplary embodiment thereof illustrated in the accompanying drawings wherein.

Figure 1:
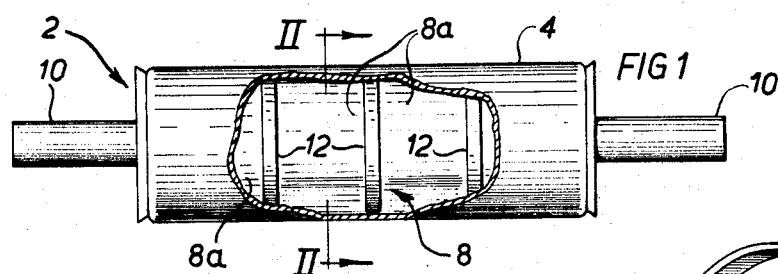
FIG. 1 is a side elevational view of a muffler in accordance with the invention with a portion of the outer casing broken away to reveal the internal construction thereof.

An automotive muffler 2 in accordance with the invention is shown in FIG. 1.

For illustrative purposes the main body of the muffler 2 is shown substantially circular in cross-section, though it will be appreciated that other shapes of muffler may serve the purposes of the invention equally well.

The muffler 2 includes a tubular outer casing 4 having a pair of closure plates 6—6 peripherally secured to opposite ends thereof, the casing 4 and the plates 6—6 together enclosing a chamber 8 through which exhaust gases from an internal combustion engine can be passed. Since the chamber 8 houses the mechanism for curtailing the exhaust noise of an engine, for convenience said chamber will be termed herein the silencing chamber of the muffler.

The plate 6—6 are formed with openings 9—9 through which exhaust gases can respectively enter and leave the chamber 8 and said openings communicate with inlet and outlet exhaust pipes 10—10 secured to the plates 6—6 in a manner to be described hereinafter and couplable respectively with the manifold exhaust and tail pipes of a motor vehicle. It is envisaged that in the muffler 2 the exhaust gases will flow in the direction from right to left of FIG. 1.

Within the casing 4 a plurality of plate-like baffles 12 is mounted in the line of travel of gas through the muffler, dividing the silencing chamber 8 into a series of hollow compartments 8a. Preferably one compartment 8a is disposed between each end plate 6 and the baffle 12 adjacent thereto.

Figure 2:
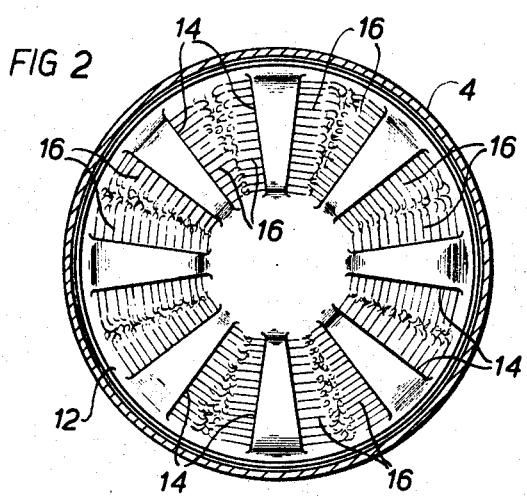
FIG. 2 is a section on the line 11—11 of FIG. 1.
Figure 3:
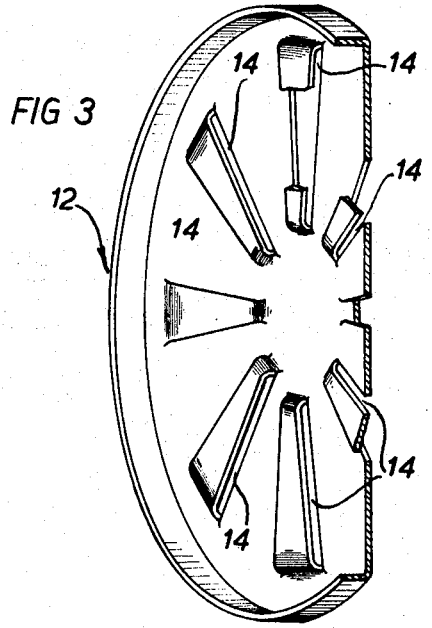
FIG. 3 is a perspective view, partly broken away, of a baffle forming part of the muffler of FIG. 1.

The baffles 12 may be of identical construction and the detailed structure of one said baffle is illustrated in FIGS. 2 and 3. The baffle 12 which in the present embodiment is generally circular, is formed with a plurality of pairs of vents 14 which may be disposed radially on said baffle as shown.

The vents 14 may be formed by substantially radial slots in the baffle 12, the material of the baffle disposed between two such slots being depressed out of the general plane of the baffle to orient the vents 14 in accordance with the requirements of the invention.

More specifically the vents 14 are so oriented in the baffle 12 that a body of gas passing through the silencing chamber 8 of the muffler 2 between the inlet and outlet exhaust pipes 10—10 encounters the baffle 12 and in passing through the vents 14 therein is divided, temporarily at least, into a plurality of streams each of which is opposed to and impinges upon at least one other of said streams.

In FIG. 2 an attempt has been made pictorially to represent gas streams 16 emerging from the vents 14 on the side of a baffle 12 remote from the inlet of the muffler 2. It will be observed that the vents 14 are disposed in more or less oppositely directed pairs whereby the streams of gas passed by the respective vents of any one pair are directed in substantially opposite directions and impinge upon each other. It will also be observed that the baffle 12 extends across the full width of the chamber 8 so that gas cannot by-pass the baffle but must travel through the vents 14.

The separation of the gas body into impinging streams 16 occurs each time the gas encounters and passes through one of the baffles 12 and although the precise reasons for the sound reducing and modifying effect thereby produced are not wholly understood, this arrangement has been found highly satisfactory in subduing and acoustically modifying exhaust noises to render them acceptable to the human ear.

It has also been found that a muffler embodying the baffles 12 is quite capable of accommodating and transmitting gas in the requisite volumes and does not give rise to undersirable back pressure in the exhaust system.

The number of baffles in the silencing chamber 8 may be varied in accordance with the degree of muffling (i.e. sound deadening and/or modification) required and it will be obvious that the muffling characteristics of a muffler of standard external dimensions may be determined to a substantial degree by the number of baffles 12 disposed within said chamber. As has previously been explained this feature is particularly advantageous in a muffler intended for application to a diversity of vehicles.

Figure 4:
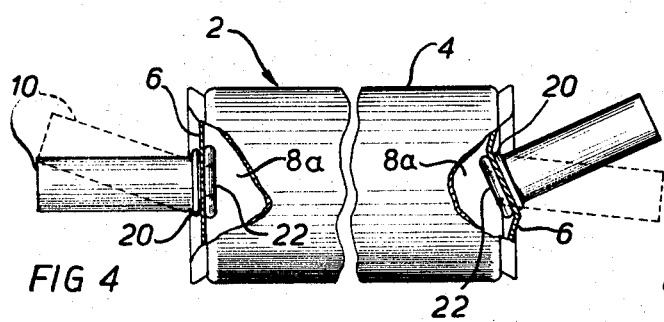
FIG. 4 is a side elevational view of a muffler in accordance with the invention partly broken away to show the attachment of the inlet and outlet exhaust pipes to the main body of the muffler.
Figure 6:
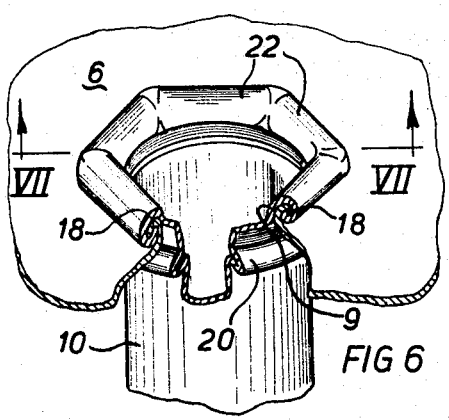
FIG. 6 is a perspective view showing a fragment of an end closure plate forming a part of the muffler of FIG. 5 with an exhaust pipe attached thereto, the view being taken from the inner side of the plate which is broken away to show an externally projecting part of said pipe.
Figure 7:
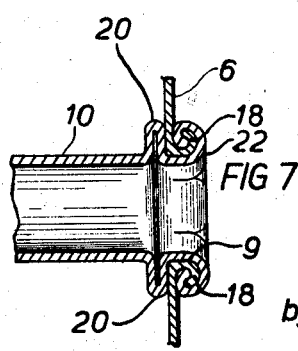
FIG. 7 is a section on the line V11—V11 of FIG. 6.

Attention is now directed to FIGS. 4, 6 and 7 wherein is illustrated the joint between an exemplary inlet or outlet exhaust pipe 10 and the closure plate 6 associated therewith. It will be understood that preferably the connection or joint between each of the exhaust pipes 10—10 and its associated closure plate is identical and that therefore a description of one such joint will suffice for the purposes of the present disclosure.

As previously mentioned, the plate 6 is formed with an exhaust opening 9. A collar 18 formed integrally with the plate 6 is disposed about the edge of the opening 9 on the inner side of the plate 6, that is the side adjacent to the silencing chamber 8. The collar 18 is constituted by the edges of the opening 9 turned inwardly towards the interior of the chamber 8.

At a preliminary stage in the manufacture of the muffler the collar 18 has the form of a more or less uniform tube which may be cylindrical. An open end of an exhaust pipe 10 having an integral flange 20 thereon of greater diameter than the opening 9 is inserted in the opening 9 and the flange 20 thereof is brought into contact with the outer surface of the plate 6. At this stage said end of the pipe 10 is telescoped snugly within the collar 18, with the inner edges of the pipe and collar more or less conterminius, and said pipe and collar edges are then rolled together by a known technique to produce a bead 22 constituted by tightly mating symmetrical convolutions of said pipe portion and collar. Preferably as it is formed the bead 22 is given a distorted annular conformation by the dies used to effect the rolling operation, and in the present instance the bead has the octagonal conformation shown in FIG. 6. Such conformation of the bead, of course, strongly militates against rotation of the parts 6 and 10 relative to each other.

The bead 22 constitutes a frictional, gas-tight, continuous interlock between the pipe 10 and the plate 6 surrounding the opening 9 in the said plate and it will be noted that the bead 22 co-operates with the flange 20 on the pipe 10 to sandwich the plate 6 firmly and tightly between them.

Figure 5:
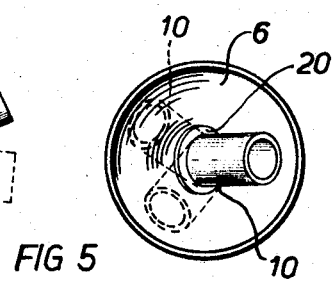
FIG. 5 is an end elevation of the muffler of FIG. 4 illustrating various exemplary positions to which the inlet or outlet exhaust pipe may be deflected.

It will be recalled that the pipe 10 is intended to be deflectible, as indicated in FIG. 5 for example, for alignment and coupling with the manifold exhaust and the tail pipe of a vehicle. The above described joint is particularly suitable for employment in a muffler which is to be used in this manner, since it affords a strong, mechanical, non-welded connection between the two parts which transmits stresses, in particular radial stress, from the pipe 10 to the plate 6 over a zone having substantial area. That is to say the sandwiching of the plate 6 between the flange 20 and the bead 22 has the effect of distributing said stresses over the whole of the sandwiched region in contrast to the concentration of stresses which may be expected at a mere linear connection such as might be achieved, for instance, by welding the pipe 10 in the opening 9. When, therefore, the pipe 10 is stressed in a more or less radial direction to reorient it with respect to the remainder of the muffler, the plate 6 is deformed or warped as illustrated at the right-hand end of FIG. 4 while the joint between the plate and the pipe is to all practical purposes undeformed and undamaged. Such warping of the plate 6 is, of course, greatly facilitated by the fact that the opening 9 occupies a relatively small fraction of the total area of the plate, leaving a relatively extensive area thereof to be warped.

The rolled joint of the invention has various other advantages over a welded joint which enhance its suitability for the present application. Specifically, with the bead 22, the metal of the joined parts remains in its normal state—it is not rendered brittle (and hence subject to fracture under stress) as is often the case with welded joints. Moreover welded joints are frequently discontinuous, being formed by a series of spot welds which do not wholly restrict the joined parts against play relative to each other.

Obviously in the structure of the invention, play between the pipe 10 and plate 6 cannot be tolerated since it may well result in gaping at the joint when the pipe 10 is deflected as previously described, permitting leakage of gas on the one hand and entry of corrosive matter to the interior of the muffler on the other. In accordance with the invention such play is substantially eliminated by the tightly convoluted, mating formations of the pipe 10 and plate collar 18 constituting the bead 22, by the distorted annular conformation of the bead 22 and by the tight sandwiching of the plate 6 between the bead 22 and the flange 20 on the pipe 10.

A further feature of importance resides in the fact that the pipes 10 do not extend deeply into the silencing chamber 8—they termniate at the bead 22—and that their only connection with the interior mechanism of the muffler, that is the baffles 12, is indirect through the end plates 6 and the casing 4. Obviously any direct connection of the pipes 10 with said interior mechanism would severely restrict, the degree and direction of deflection of which said pipes were capable, if it did not negative such deflection entirely, and it will be most apparent that the "universality" of the muffler 2 is to some extent a function of the deflectability or reorientability of the pipes 10. It is also noteworthy that the aforesaid deflection of a pipe 10 and corresponding warping of the end plate 6 associated therewith are facilitated by the provision of a hollow space or compartment 8a between the end plate 6 and the baffle 12 adjacent thereto.

If not already made clear by the foregoing, it is contemplated that deflection of the exhaust pipes 10—10 be achieved principally, if not wholly, by warping of the end plates 6—6 and that any deflection achieved by deforming the projecting portions of the pipes 10—10 themselves is subsidiary thereto.

In summary, the invention provides an improved muffler of silencer for a motor vehicle having features rendering it installable as a replacement component on a wide range of different models and makes of vehicles notwithstanding that the original mufflers installed by the makers of said vehicles differed appreciably from each other both in dimension and in placement and orientation of their inlet and outlet exhaust pipes.

Although the invention has been particularly described with reference to the embodiments thereof shown in the accompanying drawings it should be understood that said embodiments have been described for illustrative purposes only and that many changes and modifications in said embodiments will suggest themselves to persons skilled in the art to which the invention relates, all such embodiments falling within the scope of the claims now following.

What I claim is:

1. An automobile muffler comprising:
    a tubular outer casing;
    closure plates secured to and closing the respective ends of said casing, said closure plates each having an exhaust opening formed therein for respectively admitting and discharging gases travelling through said casing;
    structure in the interior of the casing for treating the gases travelling therethrough to modify the sounds entrained in such gases;
    an integral inturned collar surrounding each said exhaust opening and constituted by the edges of said opening turned inwardly towards the interior of the casing;
    exhaust pipes each having an open end telescopically installed in one of said collars;
    symmetrical mating convolutions of said collar edge and open pipe end providing a continuous interlock surrounding said opening and forming a frictional, gas-tight connection between said pipe and a said closure plate;
    said closure plate being warpable; said opening extending over a relatively minor fraction of the total area of said closure plate, and said interlock being strongly resistant to radial stresses on said exhaust pipe, permitting warping of said closure plate by said stresses to deflect the exhaust pipe into a predetermined desired direction.

2. A muffler as claimed in claim 1 wherein:
    said interlock forms a bead on the undersurface of said closure plate;
    said bead having a distorted annular peripheral conformation to resist relative rotation between said exhaust pipe and said closure plate.

3. A muffler as claimed in claim 1 wherein:
    said interlock forms a bead on the undersurface of said closure plate; and
    said exhaust pipe is provided with an annular flange; said closure plate being sandwiched between said bead and said flange to assist in the transmission of stresses from the exhaut pipe to the closure plate.

4. A muffler as claimed in claim 1 wherein:
    said structure in the interior of said casing includes a plurality of plate-like baffles disposed in the line of travel of gas through the muffler and dividing the casing into a series of compartments;
    each said baffle having a plurality of pairs of vents therein;
    each said pair of vents being oriented to permit passage of gas therethrough in mutually opposing and impinging streams.

5. A muffler as claimed in claim 4 wherein:
    said pairs of vents are disposed radially in said baffles.

6. A muffler as claimed in claim 4 wherein:
    said compartments are hollow;
    one of said compartments being disposed between each said closure plate and the baffle adjacent thereto.

7. A muffler as claimed in claim 4 wherein:
    each said baffle is disposed across the full width of said casing preventing gas from passing therealong otherwise than through said vents.

8. A method of securing an exhause pipe to an end closure plate of an automotive muffler comprising the steps of:
forming an exhaust opening in said plate;
turning the edges of said opening inwardly towards the interior of the muffler to form an integral, inturned collar around said opening;
telescopically installing an open end of said exhaust pipe in said collar with the collar and pipe edges substantially conterminous;
rolling said pipe and collar edges in mating convolutions forming a continuous interlock surrounding said opening and forming a frictional, gas-tight connection between said pipe and said closure plate, and
imparting to said convoluted pipe and collar edges a distorted annular conformation enhancing the resistance of those parts to rotation relative to each other.

9. A method as claimed in claim 8 including the further steps of:
providing an annular flange on said exhaust pipe, and sandwiching said plate between said flange and a bead formed by said continuous interlock to assist in the transmission of stresses from the exhaust pipe to the closure plate.

References Cited

UNITED STATES PATENTS

| | | |
|---|---|---|
| 801,796 | 10/1905 | Kramer et al. |
| 956,170 | 4/1910 | Radell _____ 181—68 XR |
| 1,278,965 | 9/1918 | MacKenzie et al. ___ 181—63 |
| 1,595,304 | 8/1926 | Hulbert. |
| 1,735,789 | 11/1929 | Powell _____ 181—69 XR |
| 1,761,971 | 6/1930 | Cram _____ 181—63 |
| 2,151,702 | 3/1939 | Ilg _____ 285—382 XR |
| 2,511,597 | 6/1950 | Marx _____ 181—58 |
| 2,690,812 | 10/1954 | Sparrow. |
| 2,834,425 | 5/1958 | Rawson. |

FOREIGN PATENTS 26,860  5/1931  Australia.

ROBERT S. WARD, JR., *Primary Examiner.*